United States Patent [19]
Drummond et al.

[11] Patent Number: 5,275,635
[45] Date of Patent: Jan. 4, 1994

[54] COASTAL AIR WASH SYSTEM

[75] Inventors: James E. Drummond, Oceanside; Lauren M. Purcell, Signal Hill; Victor Vali, Laguna Hills; Norton L. Moise, Pacific Palisades; Janet M. McWaid, Los Angeles, all of Calif.

[73] Assignee: Hughes Aircraft Company, Los Angeles, Calif.

[21] Appl. No.: 912,066

[22] Filed: Jul. 8, 1992

Related U.S. Application Data

[63] Continuation of Ser. No. 469,888, Jan. 24, 1990, abandoned.

[51] Int. Cl.$^5$ .............................................. B01D 47/06
[52] U.S. Cl. ...................................... 55/220; 55/385.1
[58] Field of Search .............................. 55/220, 385.1

[56] References Cited

U.S. PATENT DOCUMENTS

| | | | |
|---|---|---|---|
| 3,983,192 | 9/1976 | Stoker | 261/115 |
| 4,776,772 | 10/1988 | Everett | 417/333 |
| 4,852,801 | 8/1989 | Fuller et al. | 239/23 |
| 4,948,046 | 8/1990 | Przystawik | 239/23 |

FOREIGN PATENT DOCUMENTS

| | | | |
|---|---|---|---|
| 3413198 | 10/1985 | Fed. Rep. of Germany | 261/115 |
| 632179 | 9/1928 | France | 239/23 |
| 165674 | 10/1981 | Japan | 417/332 |

*Primary Examiner*—Robert Spitzer
*Attorney, Agent, or Firm*—Georgann S. Grunebach; Terje Gudmestad; W. K. Denson-Low

[57] ABSTRACT

A system for washing the air in a coastal environment in which a volume of air moves from a land mass to a water mass. The system includes a plurality of fountains 12 mounted offshore which spray a volume of water into the path of the air flow. Water is stored under pressure and selectively released to form the spray. In specific embodiments, wave motion is used to provide the power to pressurize the stored water. Wave power is extracted by dual reciprocating pumps 50 and 51 connected to a float 40. Wave power is amplified by lenses 20 which focus the waves onto the floats 40. A control system 100 senses pollution and controls the generation of the spray. In addition, wave motion is sensed and used to control the position of the lens 20 for optimum performance and minimum wear.

18 Claims, 7 Drawing Sheets

COASTAL AIR WASH SYSTEM

This is a continuation of application Ser. No. 07/469,888 filed Jan. 24, 1990 now abandoned.

BACKGROUND OF THE INVENTION

1. Field of the Invention

The present invention relates to pollution control systems and techniques. More specifically, the present invention relates to techniques for abating air pollution in coastal areas.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In Los Angeles and other cities, pollution levels are currently so high, that national pollution level goals will not be attained in the near future. In addition to the obvious adverse impact on health, property and the environment, governmentally imposed caps on pollution have limited new business growth in these "nonattainment" areas. Accordingly, there is a need to reduce the level of air pollution in these areas.

Accordingly, many techniques are under consideration for reducing air pollution. Most of these techniques involve pollution control at the source, are prohibitively expensive and impact personal and industrial operations.

Thus, there is an ongoing need for an inexpensive technique for reducing air pollution which does not adversely impact personal and industrial operations.

SUMMARY OF THE INVENTION

The need in the art is addressed by the present invention which provides a system and technique for washing the air in a coastal environment in which a volume of air moves from a land mass to a water mass. The system includes a plurality of fountains mounted offshore which spray a volume of water into the path of the air flow. Water is stored under pressure and selectively released to form the spray.

In specific embodiments, wave motion is used to provide the power to pressurize the stored water. Wave power is extracted by dual reciprocating pumps connected to a float. Wave power is amplified by lenses which focus the waves onto the floats. A control system senses pollution and controls the generation of the spray. In addition, wave motion is sensed and used to control the position of the lens for optimum performance and minimum wear.

BRIEF DESCRIPTION OF THE DRAWINGS

FIG. 3($a$) is a frontal view of the spray created by a single fountain of the coastal airwash system of the present invention.

FIG. 3($b$) is a top view of the spray created by a single fountain of the coastal airwash system of the present invention.

DESCRIPTION OF THE INVENTION

An illustrative embodiment will now be described with reference to the accompanying drawings to disclose the advantageous teachings of the present invention.

Figure 1:
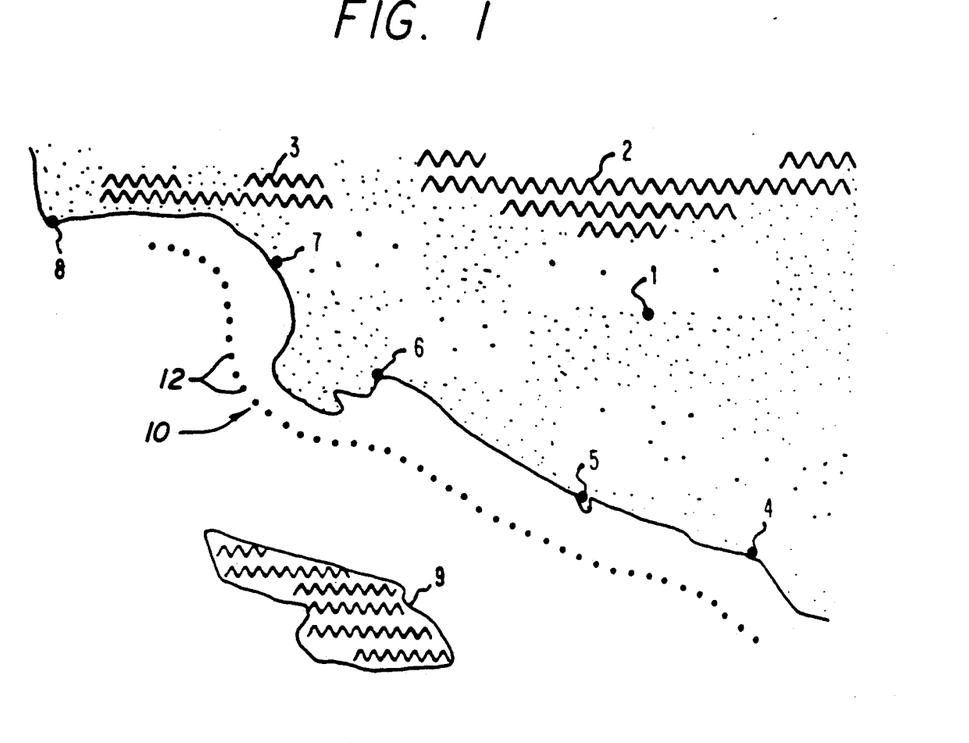
FIG. 1 is a topographical view of a coastal environment with the airwash system of the present invention.

The pollution abatement system of the present invention is intended for use in any coastal environment which experiences offshore and onshore airflow on a regular basis. FIG. 1 is a topographical view of the coastline of California in the vicinity of the city of Los Angeles (L.A.), a city which has a pollution abatement problem. In the illustrative embodiment, the concept of the coastal airwash system 10 of the present invention involves nightly washing of the offshore airflow from the Los Angeles basin via a spray generated by a plurality of fountains. In FIG. 1, for the Los Angeles basin, location 1 would correspond to Los Angeles, location 2 to the San Gabriel mountains, location 3 to the Santa Monica mountains, location 4 to Dana Point, location 5 to New Port Beach, location 6 to Long Beach, location 7 to Santa Monica, location 8 to Point Dane, and location 9 to Cataline Island. The plurality of fountains 12 would spray water in to the air to wash pollutants from the air as it flowed offshore from the above locations. In accordance with the present teachings, approximately forty fountains located one mile offshore and spaced at one mile intervals, would be required to span the Los Angeles coast. Each fountain 12 would be located in a platform as discussed more fully below. For the illustrative embodiment, the fountains are designed to deliver the total equivalent of 14 inches of rainfall per year over the entire L.A. basin (700 sq. mi.). This amount was chosen out of a recognition of the cleaning effect of a mere ¼ inch of rainfall on the basin. That much would be produced more than twice a month by the present invention, the cleaning effect of which would be combined with that of the very irregular natural rainfall.

In Los Angeles, air pollution is trapped by an inversion layer, a layer of warm air. For most effective cleaning, the fountains 12 are designed to jet water up to the top of the inversion layer, a maximum of 2000 feet. To reach 2000 feet, a water velocity of 110 meters per second is required. The required water velocity dictates the operating time, pipe and nozzle diameters, and required pressurization. That is, the fountain must eject 12 million gallons of water over a 3 hour period each day to deliver the desired equivalent of rainfall. To reach 2000 feet, the water must be stored under a pressure of 60 atmospheres. In the illustrative embodiment, the water is stored in a tank at a depth of ten fathoms. Thus, an additional 2 atmospheres would be needed to overcome the weight of water over the tank and 2 more to overcome the frictional head loss in a 100 ft. fountain stem 8.7 inches in diameter conducting 110 m/s water flow. The frictional loss in the free jet through the air should be negligible until it breaks up into drops. Hence, the total gauge pressure needed is 64 atmospheres for the system depicted in the illustrative embodiments. This means that 79 MWh of energy are required for each of the forty fountains. If this amount were taken from the local power grid, it might add significant pollution to the environment through radioactive or chemical wastes. Fortunately, ample power is available from the ocean water waves in which the fountains are immersed.

Thus, in accordance with the present teachings, the energy required to achieve the necessary pressurization is supplied by waves focused on floats attached to pumps by water lenses situated one to two miles further offshore as permitted by local traffic. As discussed more fully below, energy developed by wave power is stored in gas storage tanks which, in the illustrative embodiment, are repressurized from 64 atmospheres to 107 atmospheres over a 24 hour period. (The top pressure depends upon the volume of the gas storage tank, which in the illustrative embodiment, is taken to equal the volume of a water storage tank.)

Figure 2:
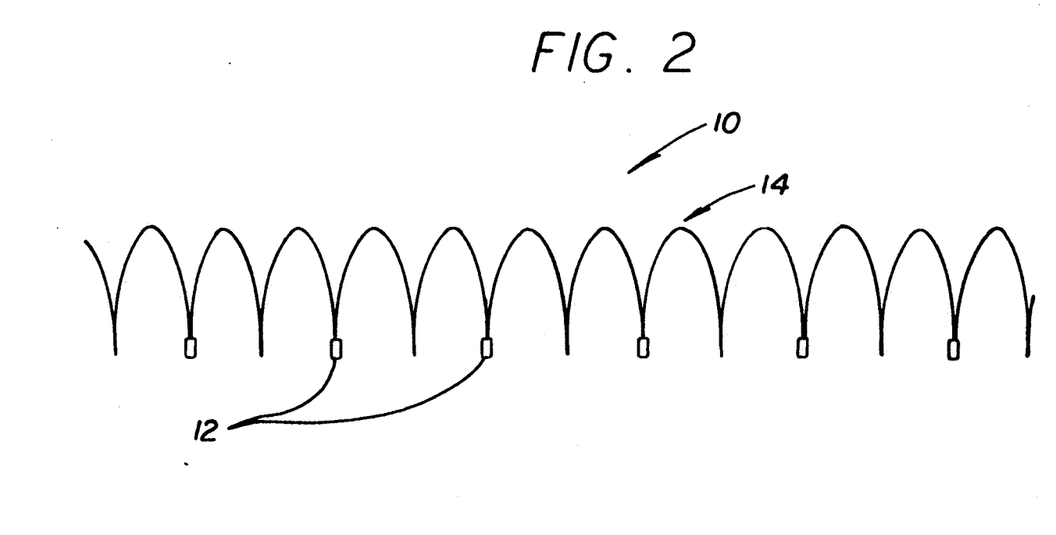
FIG. 2 is a frontal view representing the curtain of spray created by the coastal airwash system of the present invention.

As illustrated in the partial system frontal view of FIG. 2, the fountains 12 provide curtains of spray 14. As illustrated in the magnified frontal view of a single fountain, in FIG. 3(a), each fountain 12 provides two jets of water 16 which, in the illustrative embodiment, extend up to 2000 feet. FIG. 3(b) is a top view of a fountain 12 showing the jet 18 as blown by offshore or onshore flow of air.

Figure 3A:
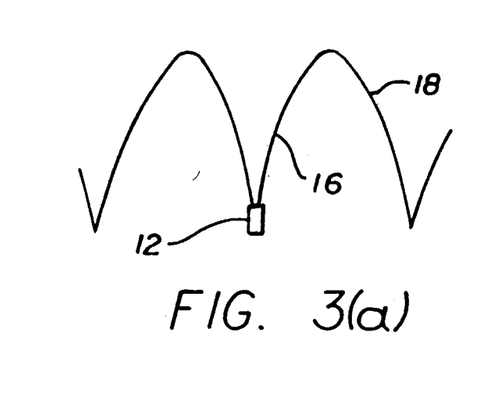
Figure 3B:
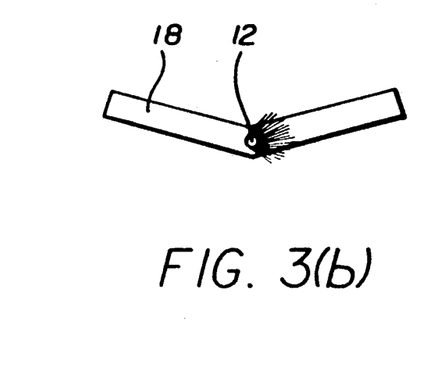

The rate of offshore or onshore air flow can be expected to affect the shape or distribution of water in the spray as shown by the blown back jet 18 in FIGS. 3(a) and 3(b).

Figure 4:
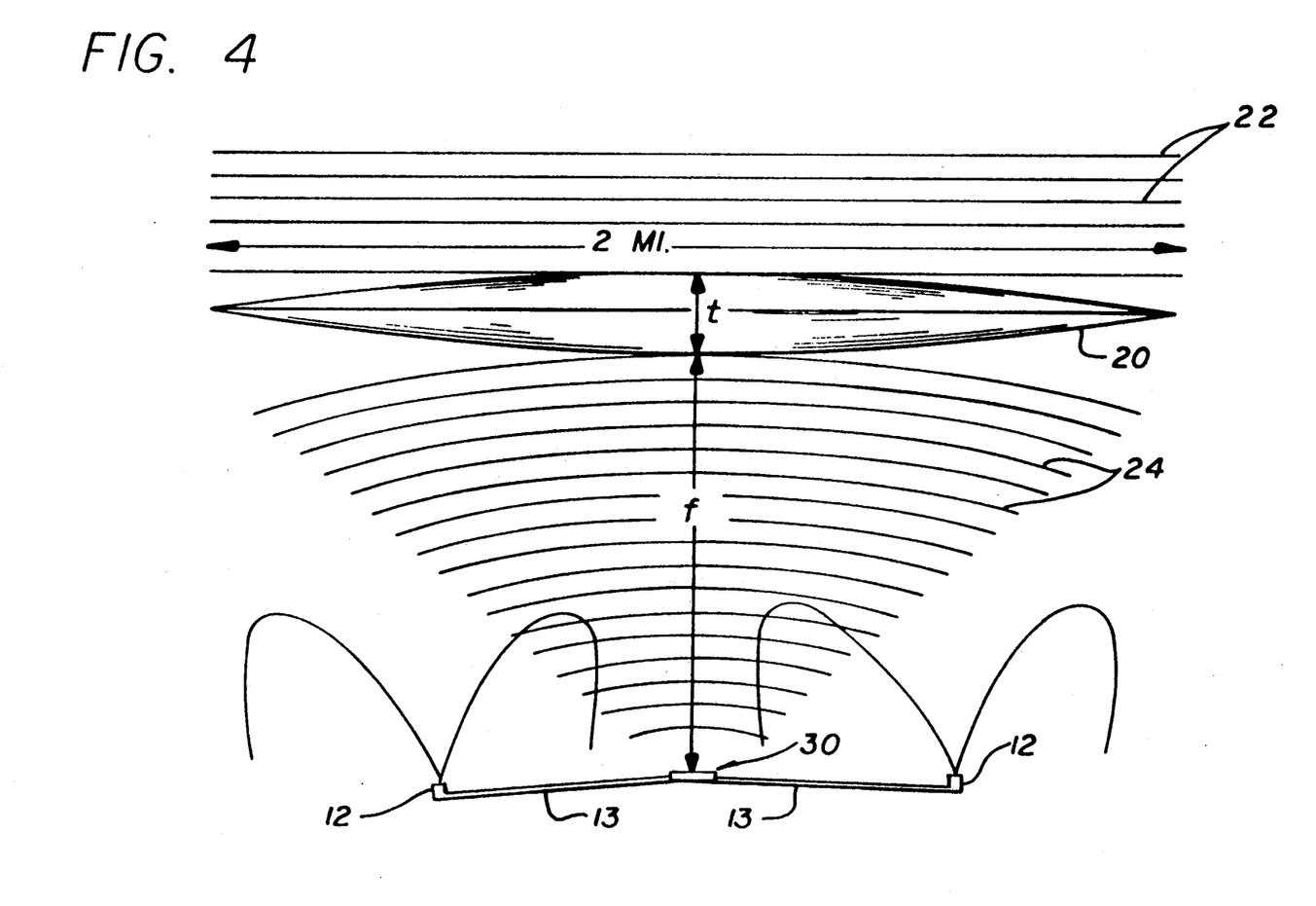
FIG. 4 is a top view from 30° above the horizon representing a lens, a float and two fountains of the coastal airwash system of the present invention.

As mentioned above, the energy required for the fountains is provided by wave motion via floats and pumps. Lenses focus the waves onto the floats for maximum effectiveness. One pumping station, with a lens, a float and a set of pumps, may be used for each fountain. In the alternative, each pumping station may provide the power for two fountains. This is illustrated in FIG. 4 which is a top view of the system 10 and which shows a portion of the baseline coastal airwash system 10 with a set of 20 lenses, each of width, $W=2$ miles and having a focal length, $f=2$ miles. The large lenses 20 are required in order to focus incident waves 22 into converging waves 24 to achieve a small focal region (240 meters wide) at a pumping station 30, which in the preferred embodiment, contains a number of floats and pumps. Using conventional thick circular lens formulas, the relation between f (the focal length) and R (the radius of curvature) is set forth by equation 1 below:

$$1/f = (n-1)[2/R - (n-1)t/nR^2] \quad [1]$$

where n is the index of refraction and t is the front-to-back thickness of the lens 20. The variable t is given by:

$$t = 2R[1 - \cos(\Theta)] \quad [2]$$

where $\Theta = \arcsin(W/2R)$. R and t Can be found from f, W, and n:

$$R^4 - 4(n-1)fR^3/n - 4(n-1)^2 f^2(1 - 2/n)R^2 + \quad [3]$$

$$(n-1)^4 f^2 W^2 = 0$$

With the lenses having a width w of 2 miles, a focal length f of 2 miles, and a value of $n=3$, R works out to 7.56 miles, $t=214$ meters or $R=3.01$ miles and $t=550$ meters. For $n=2$, the corresponding numbers are $R=3.68$ miles, $t=446$ meters or $R=2$ miles and $t=862$ meters. The radius of curvature does not appear directly in FIG. 4, however, it determines the curvature of the lens 20 which is drawn to proportionate scale for the illustrative embodiment.

Figure 5:
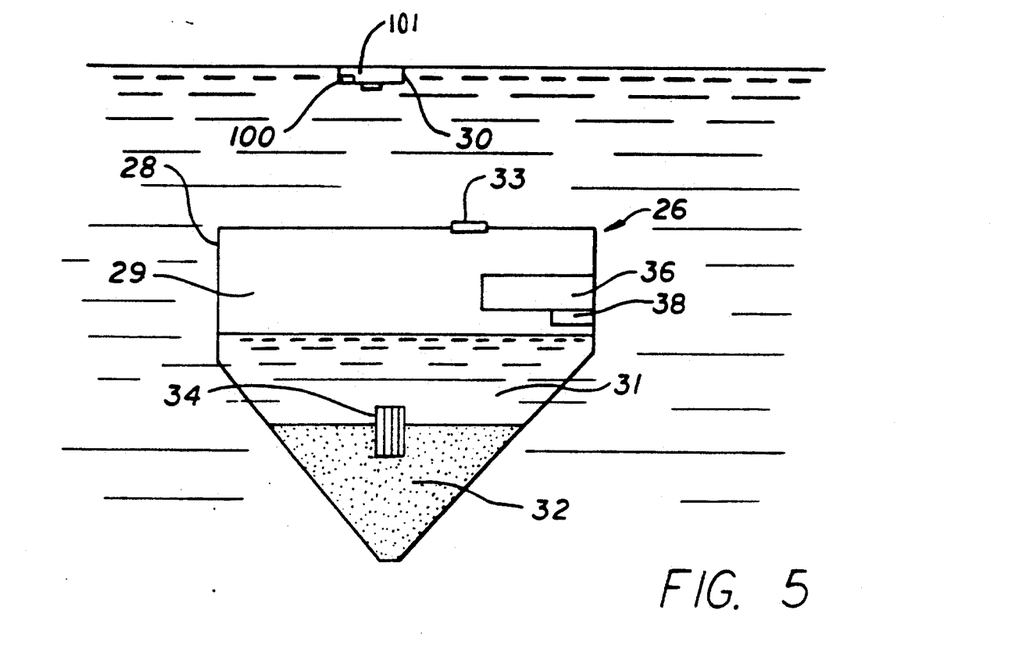
FIG. 5 is a side view of a section of a lens section of the coastal airwash system of the present invention.

As is evident from the top view of FIG. 4, in the illustrative embodiment, each lens 20 is formed by making a shelf under water in the shape of the intersection of two circles. That is, lenses 20 are symmetric with opposite curvature functions on front and back. The lenses 20 are made of approximately two thousand nearly identical sections 26, one of which is illustrated in FIG. 5. Each section 26 consists of a flexible, strong, preferably inexpensive plastic covering 28 of polyvinylchloride or other suitable material. The covering 28 is stretched over the top and down the sides of a wooden or plastic frame (not shown). Air is trapped underneath the plastic covering 28 in a pocket or chamber 29. Water 31 is also contained within the lens section 26. A sand ballast 32 is included within each section 26 to provide the proper average density to give the lens neutral buoyancy. Scuba gear 34 is also provided within each lens section 26. The scuba gear 34 provides slow-acting depth control and is activated by acoustic underwater signals from a central wave-sensing apparatus 38 located near or within the lens. The wave-sensing apparatus 38 includes sensors for detecting the wave period and sends signals for automatically adjusting the depth of the lenses for proper focus. The wave-sensing apparatus may be implemented by using conventional inertial accelerometers. The compressed air in the scuba gear 34 can be released to increase the air trapped in the pocket under the plastic sheet to raise the lens or the escape valve 33 can be opened to release some air to lower the lens.

A stabilizer 36 is also provided in each lens section 26. The stabilizer 36 provides vernier position control for the section 26. The stabilizer 36 includes valves (not shown) for allowing wave action to compress air into the stabilizer 36 and alternatively to release air from the stabilizer. This use of wave action for small depth adjustments minimizes the need for re-filtering the scuba tank. Without a stabilizer, the lens section 26 would either rise to the ocean surface or sink to the bottom. If the section 26 rises, over a time scale long compared with the period of a wave, the trapped air would expand producing greater buoyancy. Thus, an initial rise would cause further rise. To prevent this, the stabilizer 36 provides a side chamber with valves (not shown) controlled by the position of the water level within the air pocket 29. If the average water level falls in the air pocket 29, air will be pumped into the side chamber by wave action raising the water level therein. If the water level rises, too much, compressed air within will be released into the chamber 29 pushing the water level down and increasing buoyancy.

Power per unit length of wavefront is equal to energy per unit area times the group velocity. Energy per unit area of progressive water waves of amplitude, a, is $$E = 0.5\, g\rho a^2 \quad [4]$$

where g the acceleration of gravity is equal to 9.81 m/s$^2$ and $\rho$ is the density of sea water and is equal 1,025 kg/m$^3$.

The dispersion law for water waves is:

$$\omega^2 = gk\, \tanh(kD) \text{ or} \quad [5]$$
$$D/T^2 = (g/4\pi^2)kD\, \tanh(kD)$$

where $\omega$ is the angular frequency, k, the wave number, is equal to $2/\lambda$, where $\lambda$ is the wavelength, T the period is equal to $2\pi/\omega$, D is the depth of the water or distance from the water surface to the top of the lens 20. The group velocity is:

$$v_g = \partial\omega/\partial k = 0.5\omega/k + gk\, \text{sech}(kD)2\omega \rightarrow \omega/2k = gT/4\pi \quad [6]$$
$$kD >> 1$$

The power per unit length is equal to $$0.5\, g\rho a^2 * gT/4\pi = 3.63\, \text{kW/m} \quad [8]$$

for a=1 ft. For forty miles of coastline, this design provides 235 MW of power.

The lens design of the illustrative embodiment provides a boundary condition close to that of a rigid bottom because wave generated horizontal convergence or divergence under the lens is buffered by the air, producing only a small vertical acceleration of the lens upper surface. (See "On the Focusing of Ocean Swells and its significance in Power Production" Central Institute for Industrial Research, Oslo, Norway, April, 1978. Presented at the Symposium on Wave Energy Utilization, Chalmers Institute of Technology, Gotthenberg, Sweden, October, 1979, the teachings of which are incorporated herein by reference.)

Figure 8:
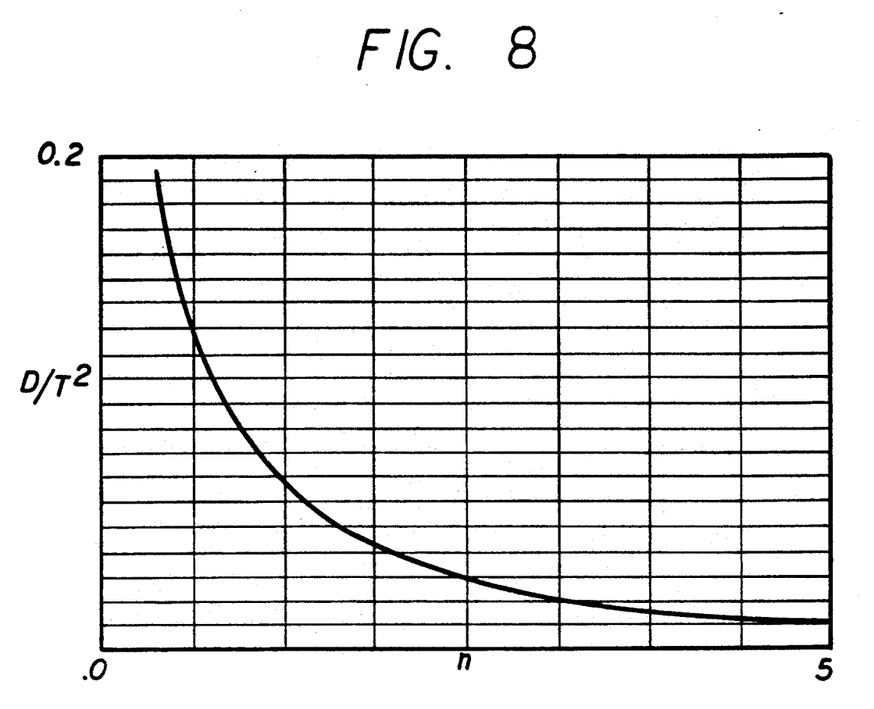
FIG. 8 is a graph of the relationship between the depth of a lens of the present invention against the index of refraction thereof.

The depth (location from the top) of the lens D is adjusted to produce the required index of refraction, n, for focusing the water waves onto floats that will, in conjunction with the pumps, extract the wave energy. (The index of refraction "n" is defined as the speed of the water waves in an infinitely deep ocean divided by their speed in the apparent depth provided by the lens-forming shelves under the surface.) The relationship between D and n is provided by FIG. 8 which plots D in meters divided by the square of the wave period in seconds.

Figure 9:
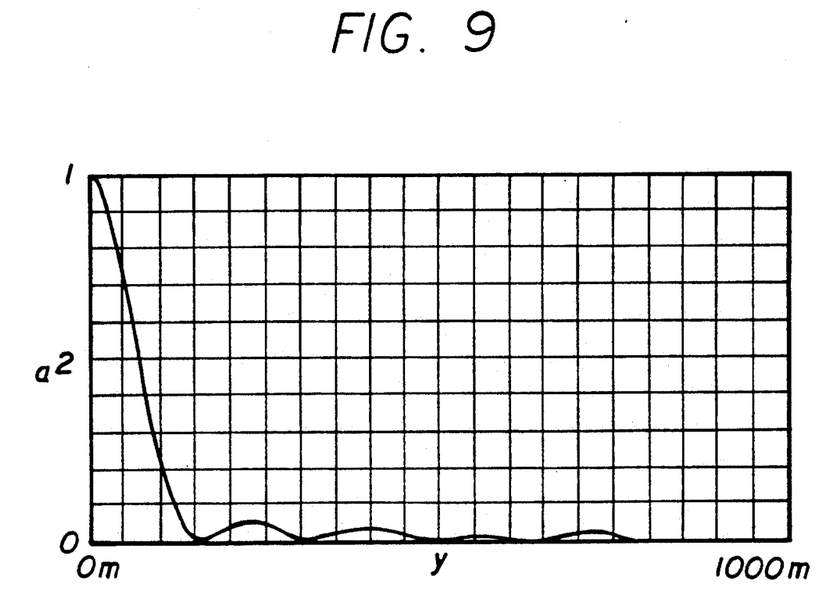
FIG. 9 shows wave power density at the focus of a lens of the illustrative embodiment of the present invention for a unit power density input wave.
Figure 10:
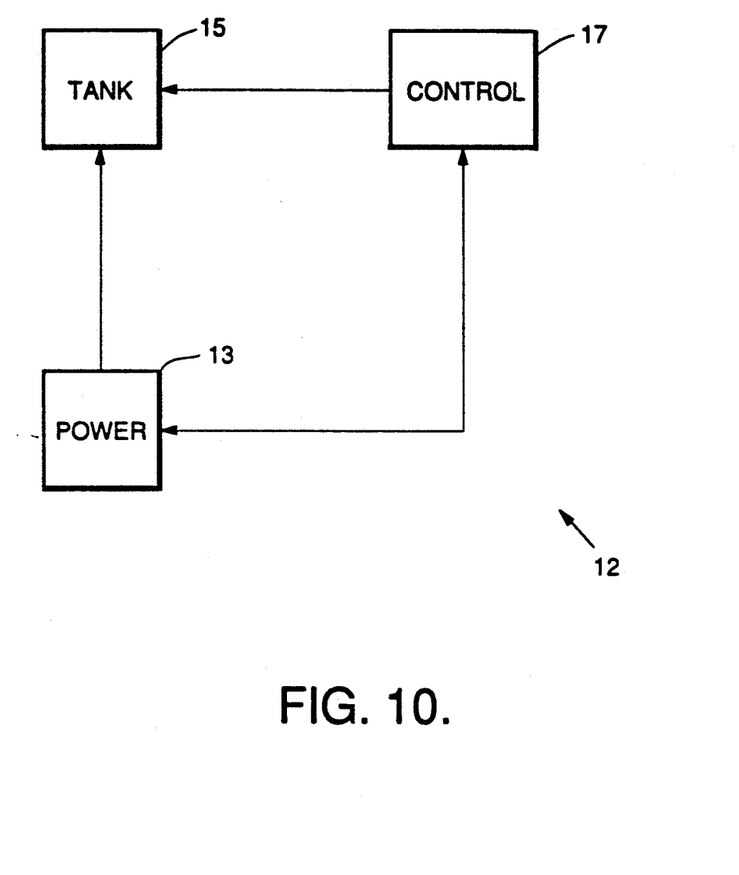
FIG. 10 is a flow chart of one embodiment of the Applicant's invention the Coastal Air Wash.

Wave optics show that focusing can occur concentrating the wave power as shown in FIG. 9 which plots the square of the relative wave amplitude at the focus of the lens for unit power density input wave versus distance y from the focal center.

In order to keep the focus centered on the floats driving the pumps, as discussed below, the lenses are moved up or down as the period of incoming waves changes from day-to-day. (The lenses may also be sunk to the bottom to prevent wave focusing during storms.) As the direction of the incoming waves changes, the position of the lenses along the shoreline changes. This is accomplished by movement of fins and tethering points along tracks within each lens. The lower ends of the tethers are anchored to the ocean bottom with reeled lines and have fins to help move and orient the lenses.

Figure 6:
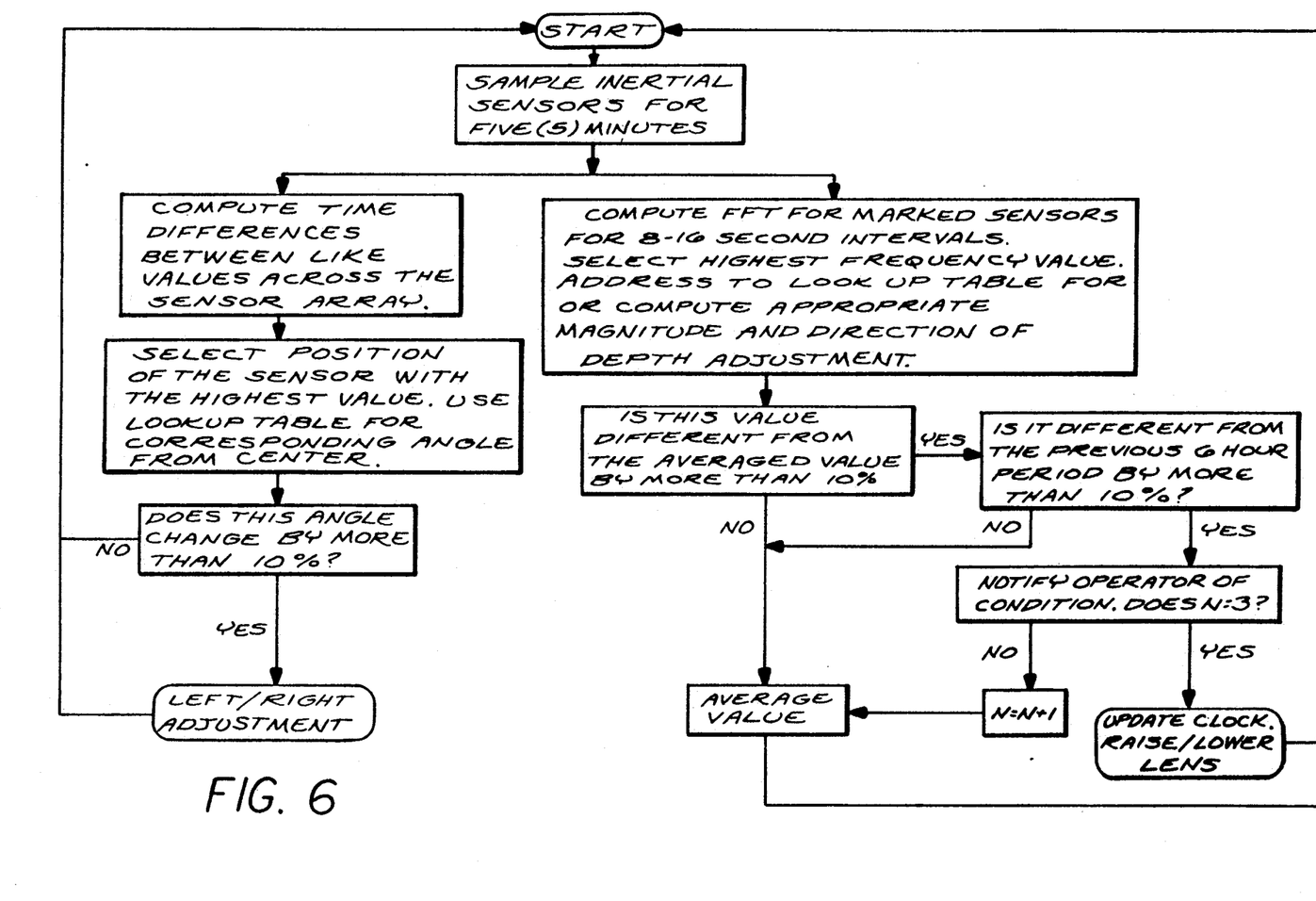
FIG. 6 is a flowchart of the lens control system of the coastal airwash system of the present invention.

The wave sensing system will adjust the lenses under the control of a control system 100 as clearly shown in FIG. 5 in accordance with the flow chart of FIG. 6. The control system 100 includes a pollution sensor 101 as clearly shown in FIG. 5. The control system 100 receives input from wind conditions and the state of fill of the air pressure storage tank 13. The control system will determine the times at which the fountains 12 will operate and will control the valves to prevent the over-pressurization of the energy storage system in a conventional manner.

Figure 7:
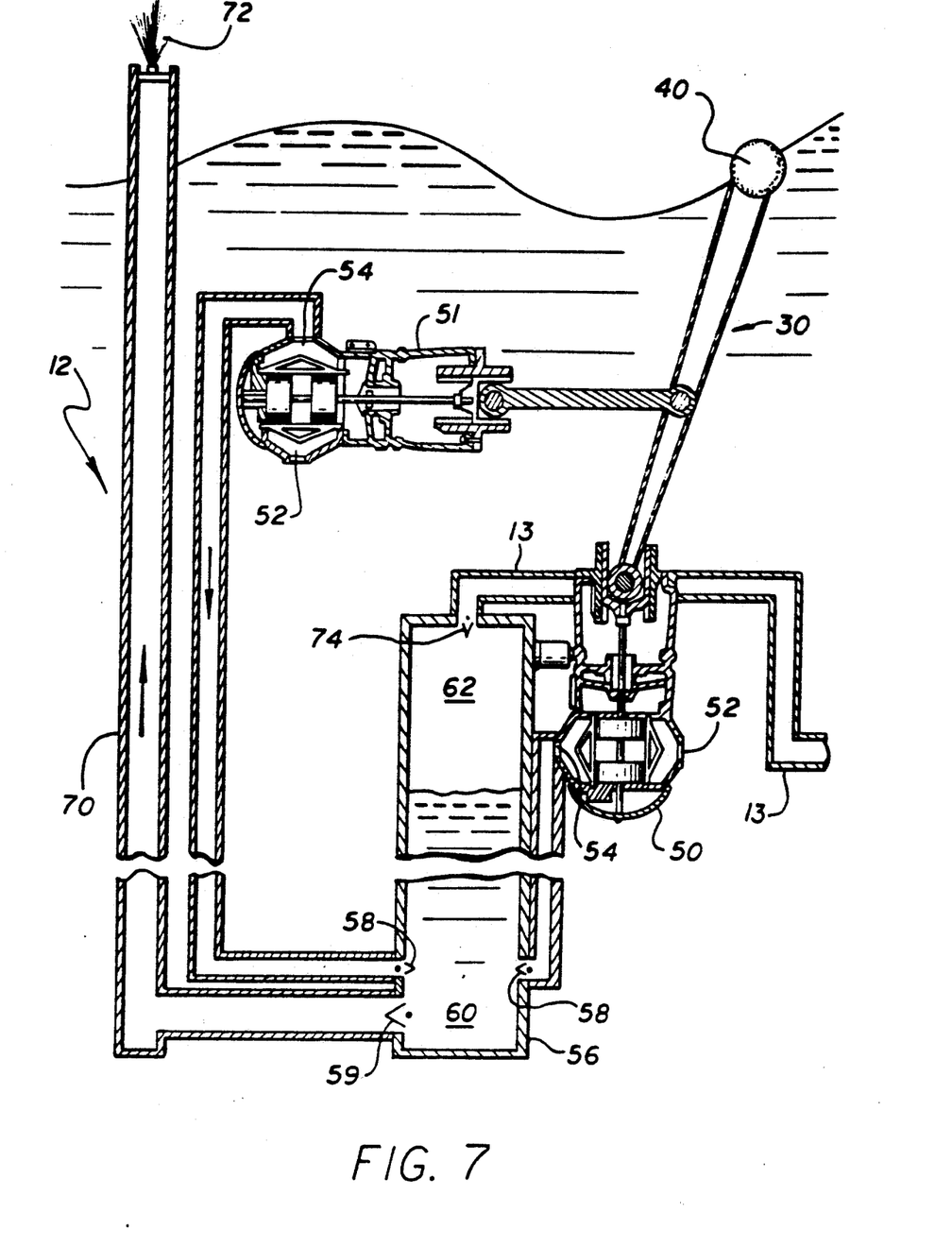
FIG. 7 is a sectional side view of a fountain and pumping station of the coastal airwash system of the present invention.

Returning to FIG. 4, the converging waves are focused on the pumping stations 30 which include the floats 40 and pumps 50 as clearly shown in FIG. 7. The pumping stations 30 provide inert gas pressurization for the fountains 12 via storage lines 13 which interconnect the fountains 12. The inert gas serves to minimize corrosion. In the illustrative embodiment, the storage lines 13 have a diameter of 5.9 m. Design considerations here are: 1) to minimize the capital cost required to contain the high pressure gas and 2) to make sure that the pipes and valves do not freeze up due to temperature lowering when the gas expands. The present design allows only a ½ deg.C temperature drop across the tube wall during expansion.

In FIG. 4, gas conventional pumps (as shown in FIG. 7) are used to directly drive the high pressure line. In FIG. 7, water pumps are used to repressurize the system. Differences in the valving and water filling requirements for alternative arrangements will be obvious to one skilled in the art. The floats 40, pumps 50 and fountains 12 are illustrated in the sectional side view of FIG. 7. (Note that the one mile gas line 13 runs behind the pump 50 and is not connected directly thereto.) Each float 40 is a semi-submerged hollow container and moves up and down in the nine to ten foot waves focused by the lenses 20. In the illustrative embodiment, the floats 40 are cylinders approximately 10 meters in length by 30 meters in diameter. (The focal region has sufficient width as well as length so that adjacent floats will not collide.) Since the two mile (3.2 km) long lens focuses 90% of 12 MW of wave power onto a focal region 240 meters long, the average power density in the focal region is 45 kW/m; the wave amplitude is 3.5 ft (7 ft. peak-to-peak). In each circular stroke of 7 ft. diameter executed in 10 seconds, the float must produce about 4.5 mega-joules of energy. This requires a force of 670 kilo-newtons. To deliver such a force, the 30 meter diameter cylinder would have to change its water displacement by 67 cubic meters. If it starts half-submerged, this is a change in submersion by 22 cm. so the stroke is reduced by this amount, 7 ft. to 6.3 ft. Thus, about 40 MJ will be delivered to the pumps.

Each float is mechanically connected to dual double-acting orthogonally mounted single stage reciprocating pumps 50 and 51. The pumps may be implemented as gas pumps or water pumps. In the illustrative embodiment of FIG. 7, water pumps are employed although gas pumps may be preferred to mitigate corrosion. The sectional side view of FIG. 7 shows a typical pump design. (The pumps are of conventional design, see *Chemical Engineers' Handbook*, Perry & Chilton, ed. McGraw-Hill, 5th Ed., p. 6-25 (1973). Typical mechanical efficiency for such pumps is 90%, slippage in the displacement is between 1 and 5% so the overall efficiency of water wave conversion to compressed gas storage is 90%*90%*90%*95% = 69%. The pumps can be built to accommodate longer strokes than expected.

Thus, additional power can be developed with higher input waves. The heat conducted to the surrounding sea water during gas compression will be regained during the three hour expansion for operation of the fountains.

The orthogonal mount of the pumps serve to translate the circular motion of the float 40 on the waves into reciprocating pumping action. That is, if a given pump derives its power from the up and down motion of a one meter long float, it will receive about 50% of the 75 kW of mechanical power available from the wave. Another pump, mounted orthogonally, activated by the same float's back and forth motion, will tap the remaining 50% of the wave power in that one meter of wave front. The buoyant force when the float 40 is submerged is g times its displaced weight of water minus the float weight which is 2.5 million newtons. This is also the force available to the vertical pump 50 during the fall of the water. The same force acts on each stroke of the horizontal pump 51.

Each of the pumps should be oversized to handle, say 75 kW. This will mean that excess power can be made available at times and that the pumps will generally be operating below their capacity. Thus, wear and maintenance will be further reduced.

The area of the valves 58 must be each less than 0.4 square meters in order that the 2.5 million newtons produce a pressure of more than 64 atmospheres to compress the air. The system will be self-regulating because the float submersion will change to balance the back pressure.

Referring to FIG. 7, water is drawn into an inlet 52 and ejected under pressure from an outlet 54. Water from each outlet 54 is delivered to a water tank 56 by first and second one-way valves 58. Since the force available from the water pump is 670 kilo-newtons and the tank which will be pressurized at most to 107 atmospheres=11 million newtons per square meter valves 58 must each be about 0.06 square meters in area→28 cm. in diameter. As water 60 fills the tank 56, gas in the tank 56 and the storage line 13 is compressed from 64 to 107 atmospheres. Since this is less than a 2:1 increase in pressure, only single stage pumps are needed. The system will be self-regulating because the float submersion will change to balance the back pressure. A third one-way valve 59 controls the flow of water up the fountain stem 70 whenever the fountain is activated. The stem 70 is sized to achieve the four cubic meters per second of water output during activation. In the illustrative embodiment, the exit diameter is 22 cm. Deflector plates 72 are fixed at the top of the stem 70. The plates 72 divide the stream into two segments which are directed up and out across the wind direction. In the illustrative embodiment, the streams are angled so that each segment will go out about 2600 feet. This provides adequate coverage of the air flow. Vibration of the plates 72 is used to control the breakup position of the jets into drops which scavenge the polluting gases and particles.

The operation of the system 10 begins with the opening by the control system 100 of the valves 59 via control means (not shown). This releases water which, after a starting transient, is subject to 64 atmospheres pressure from the gas in the chamber 62. High pressure is conducted by the gas pipe 13 through a two-way valve 74. As an exchange valve, the valve 74 is pressure-stated maintaining the pressure above the sea-water surface in the chamber 62 at 64 atmospheres during the discharge.

When the water level in the tank 56 is lowered close to the valve 59, the valve 59 is closed shutting off the water flow. To regenerate the energy expended, the reciprocal double-acting water pumps 50 and 51 force water into the tank 56. As an entrance valve, the valve 74 is a pressure stated at 107 atmospheres. This compresses the air through the two-way gas valve 74 into the mile long, 14,000 cubic meter gas gasline 13 raising the pressure therein back to 107 atmospheres. The compression takes 75 MWh of energy for each fountain; 99 MWh per fountain of which could be delivered by the continuous focused waves over the entire 24 hour cycle through the floats 40 and the pumps 50 and 51.

Hence, in the illustrative embodiment, 44,000 cubic meters of sea water are accelerated up the stem 70 and by the deflector plate 72. Once the jet breaks up into drops, an enormous surface area for absorption of atmospheric pollutants becomes available high within the coastal air. Gentle nightly breezes, approximately 8 knots, will spread these drops out from the fountains. The jets from each fountain will spray sideways to cover nearly half of the distance between fountains on each side. Only a small horizontal velocity is necessary to cover one-half mile along the coast in each direction from a single fountain. Fine tuning can optimize this coverage for scrubbing.

FIG. 10 is a flow chart of one embodiment of the Coastal Air Wash. The fountain 12, includes power mechanism 13, water tank 15 and mechanism for control 17 of the power and the tank.

Thus, the present invention has been described herein with reference to a particular embodiment for a particular application. Those having ordinary skill in the art and access to the present teachings will recognize additional modifications applications and embodiments within the scope thereof. For example, those skilled in the art will be able to adapt the present teachings for a coastal environment having more or less pollution within the ambit of any applicable economical or physical constraints, and in view of the desired degree of cleaning, without departing from the scope thereof. Further, the present invention does not preclude the use of other pollution abatement measures.

It is therefore intended by the appended claims to cover any and all such applications, modifications and embodiments within the scope of the present invention.

Accordingly, what is claimed is:

1. In a coastal environment in which a volume of air having suspended pollutants moves offshore in a known path, a system for removing the pollutants from the air including:

a plurality of fountains situated offshore and dispersed in the path of said air for spraying a volume of water into the path of said air to wash the pollutants from the air, at least one fountain comprising:

tank means for storing a volume of water;

power means for pressurizing said tank, wherein said power means includes a pump means for injecting water into said tank means; and control means for selectively allowing water to flow from the tank out of the fountains under pressure to spray the water into the air.

2. The system of claim 1 wherein said pump means includes first and second dual action pumps.

3. The system of claim 1 wherein said pump means includes float means responsive to water wave motion for providing motive force for said pump means.

4. The system of claim 3 wherein said power means includes lens means for focusing water waves to said float means.

5. The system of claim 4 wherein said lens means includes means for controlling the position of said lens.

6. The system of claim 5 wherein said means for controlling the position of said lens includes means for sensing wave motion.

7. The system of claim 1 wherein said control means includes valve means for controlling the flow of water into and out of said tank means.

8. The system of claim 1 wherein said control means includes a pollution sensor for sensing the level of pollution in the air to control the time when water is sprayed into the air.

9. A system situated in a body of water for spraying a volume of water into the air, said system comprising:
tank means for storing a volume of water;
power means for pressurizing said tank, said power means including: pump means for injecting water into said tank means, float means responsive to water wave motion for providing motive force for said pump means, and lens means for focusing water waves to said float means; and
control means for selectively discharging said water from said tank means as a spray of water into the air.

10. The system of claim 9 wherein said pump means includes first and second dual action pumps.

11. The system of claim 9 wherein said lens means includes means for controlling the position of said lens.

12. The system of claim 11 wherein said means for controlling the position of said lens includes means for sensing wave motion.

13. The system of claim 9 wherein said control means includes valve means for controlling the flow of water into and out of said tank means.

14. The system of claim 9 wherein said control means includes a pollution sensor.

15. In a coastal environment in which a volume of air moves offshore an airwash system including a plurality of fountains mounted offshore for spraying a volume of water into the path of said air flow, said system further comprising:
tank means for storing a volume of water;
power means for pressurizing said tank, said power means including:
pump means including first and second dual action pumps for injecting water into said tank means,
float means responsive to water wave motion for providing motive force for said pump means, and
lens means for focusing water waves to said float means, said lens means including means for controlling the position of said lens and said means for controlling the position of said lens includes means for sensing wave motion; and
control means for selectively allowing said pressurized water to escape said tank means to form a spray said control means including valve means for controlling the flow of water into and out of said tank means and a pollution sensor.

16. A system for removing pollutants suspended in a volume of air in a geographical area, the system comprising:
a plurality of fountains dispersed over said area, for spraying a volume of water upwards in the air substantially in an inversion layer associated with said pollutants,
at least one of said fountains comprising:
tank means for storing a volume of water;
power means for pressurizing said tank means; and
control means for selectively discharging flowing water from said tank means out of said fountain under pressure spraying said volume of water into the air up to or above said inversion layer.

17. The system of claim 16 wherein at least one of said fountains further comprise means for spraying water into the air in a plurality of separate streams.

18. The system of claim 16 wherein at least one of said fountains sprays the water into the air at an angle.

* * * * *